Sept. 4, 1934. P. P. BURNETTE 1,972,759
COMBINATION DRAFTING INSTRUMENT
Filed Oct. 19, 1932

Pearl P. Burnette
INVENTOR

BY *Victor J. Evans & Co.*
ATTORNEY

Patented Sept. 4, 1934

1,972,759

UNITED STATES PATENT OFFICE 1,972,759

COMBINATION DRAFTING INSTRUMENT

Pearl P. Burnette, Burbank, Calif.

Application October 19, 1932, Serial No. 638,614

2 Claims. (Cl. 33—149)

The invention relates to a drafting instrument and more especially to a combination instrument whereby a multiplicity of devices will be available in a single instrument.

The primary object of the invention is the provision of an instrument of this character wherein the construction thereof meets the requirement of a student of mathematics, especially in the subjects of geometry and trigonometry for use as a ruler, protractor and compass, the latter adaptable for scribing arcs and circles, thus avoiding the necessity of the possession of separate instruments for these purposes.

Another object of the invention is the provision of an instrument wherein the parts thereof are assembled in a novel manner so that the instrument in its entirety is substantially flat and light in weight whereby it may be placed within a textbook or other student equipment so that it will be convenient for use and in such use will serve as a ruler, protractor and compass.

A further object of the invention is the provision of an instrument of this character wherein the parts thereof in their assembled relation will enable the adjustment of such instrument with dispatch and on adjustment a multiplicity of devices will be available in the single instrument.

A still further object of the invention is the provision of an instrument of this character which is extremely simple in construction, requiring but few parts in the completion thereof, neat and attractive in appearance, thoroughly reliable and efficient in its purposes, and inexpensive to manufacture, as well as strong and durable.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
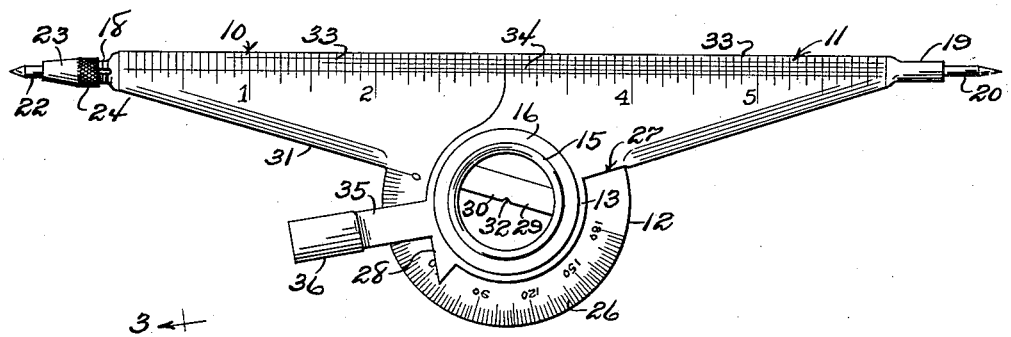
Figure 1 is an elevation of an instrument constructed in accordance with the invention and adjusted for use as a ruler.

Referring to the drawing in detail, the instrument comprises a pair of legs or arms 10 and 11 respectively, these being formed at their inner ends with circular portions 12 and 13, the portion 12 being a part of the leg or arm 10 while the portion 13 is a part of the leg or arm 11 and such portion 13 overlies the portion 12, which latter is of greater diameter than said portion 13. Both portions 12 and 13 are formed with correspondingly sized circular center openings 14, these being in register with each other and receive therein a pivot ring 15, the latter being formed with an annular flange 16 overlying the portion 13 and also with retaining lugs 17, these being circumferentially disposed in spaced relation to each other and are bent outwardly and inwardly to overlie the portion 12. Thus in this manner the legs or arms 10 and 11 are pivoted or swingingly joined with each other.

The legs or arms 10 and 11 are outwardly tapered from the circular portions 12 and 13 and at their smaller ends are provided socketed tips 18 and 19 respectively. The tip 19 has fixed therein a point 20 while the tip 18 is preferably longitudinally slit at 21, to accommodate a pencil lead 22, the tip being fitted with a threaded sleeve 23 which functions to adjustably secure the pencil lead 22 in the tip 18 as should be obvious. This sleeve 23 is of tapered formation and is provided with an external serrated surface 24 for convenient hand adjustment upon the tip 18 for the securing or releasing of the pencil lead 22.

The circular portion 12 carries the graduated linear and protractor scales 25 and 26 respectively, the latter coacting with the edge 27 of the arm or leg 11 while the circular portion 13 is formed with a pointer 28 coacting with the scale 25, these scales 25 and 26 being peripherally disposed on the circular portion 12 and are clearly visible and readable in their coaction with the edge 27 and the pointer 28 when adjusting the legs or arms 10 and 11 with respect to each other.

Figure 2:
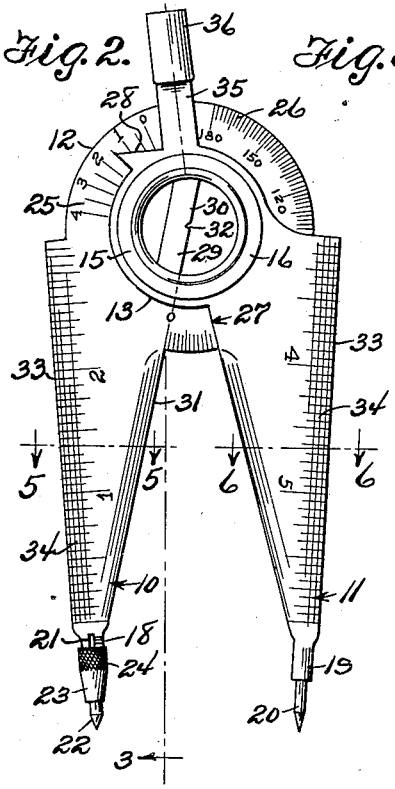
Figure 2 is a side elevation showing the instrument adjusted for use as a compass.
Figure 3:
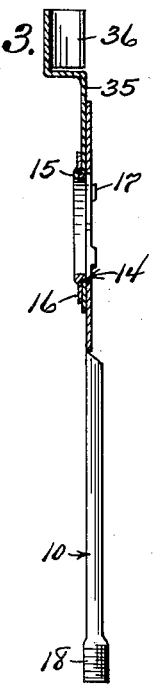
Figure 3 is a sectional view on the line 3—3 of Figure 2 looking in the direction of the arrows.
Figure 4:
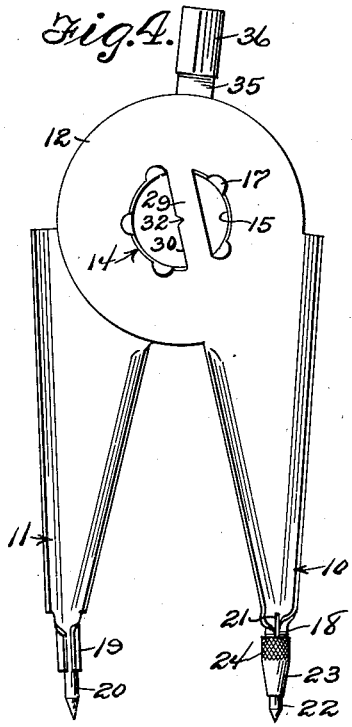
Figure 4 is a view similar to Figure 2 looking toward the opposite side thereof.
Figure 5:
Figure 5 is a sectional view on the line 5—5 of Figure 2 looking in the direction of the arrows.
Figure 6:
Figure 6 is a sectional view on the line 6—6 of Figure 2 looking in the direction of the arrows.

The circular portion 12 at its center opening 14 has a cross bridge piece 29, the latter at its edge 30 being in alignment with the heel edge 31 of the said leg or arm 10 and at the center of this bridge piece 29 is a notch 32 to function as a guide or center point, the notch being cut into the edge 30 of said bridge piece as will be apparent in Figures 1, 2 and 4 of the drawing.

The working edges 33 of the legs or arms 10 and 11 are provided with an inch graduated scale 34 and these edges serve as a measuring rule when the legs 10 and 11 have been swung to bring said edges in alignment with each other as shown in Figure 1 of the drawing.

Formed on the circular portion 13 peripherally thereof and at a convenient point is an arm or extension 35 having a handle 36 cut and bent therefrom so that the instrument can be manually manipulated when in use as a compass as shown in Figure 2 of the drawing or as a protractor as may be apparent from Figure 1 of the drawing. When used as a protractor the instrument has the unique advantage of the open vertex and is convenient in reading or constructing an angle of any number of degrees at a given point in a line.

When the instrument is utilized or used as a compass as shown in Figure 2 of the drawing the point 20 serves as a pivot for the instrument while the lead 22 will serve as a marker in scribing arcs or circles.

The legs 10 and 11 including the circular portions 12 and 13 are cut and stamped into the desired shape from sheet metal and on the pivotal connection of the portions 12 and 13 these latter serve as a head to the instrument.

What is claimed is:

1. An instrument of the character described comprising a pair of straight-edged legs having circular end portions provided with matched center circular openings, a pivot ring fitted in said circular openings and swingingly joining the circular end portions together, graduated scales carried by one of the circular end portions and each indicating the extent of separation of the legs, a pointer formed on the other circular end portion and coacting with one of the scales, a straight edge portion of one of the legs cooperating with the other scale, an extension on one circular end portion providing a handle, and a bridge piece disposed within the circular openings of the circular end portions and carried by one of the same in alignment with the heel edge of its legs and having a notch at the pivotal axis of said legs.

2. An instrument of the character described comprising a pair of straight-edged legs having circular end portions provided with matched center circular openings, a pivot ring fitted in said circular openings and swingingly joining the circular end portions together, graduated scales carried by one of the circular end portions and each indicating the extent of separation of the legs, a pointer formed on the other circular end portion and coacting with one of the scales, a straight edge portion of one of the legs cooperating with the other scale, an extension on one circular end portion providing a handle, a bridge piece disposed within the circular openings of the circular end portions and carried by one of the same in alignment with the heel edge of its legs and having a notch at the pivotal axis of said legs, a pointer carried at the tip of one leg, and a marker carried at the tip of the other leg.

PEARL P. BURNETTE.